(12) United States Patent
Chomel et al.

(10) Patent No.: US 8,721,957 B2
(45) Date of Patent: May 13, 2014

(54) METHOD AND DEVICE FOR FORMING CONTAINERS WITH COUNTER-PRESSURE

(75) Inventors: Nicolas Chomel, Octeville sur Mer (FR); Jules Tonga, Octeville sur Mer (FR); Jean-Christophe Langlois, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 247 days.

(21) Appl. No.: 13/132,479

(22) PCT Filed: Dec. 1, 2009

(86) PCT No.: PCT/FR2009/001364
§ 371 (c)(1),
(2), (4) Date: Aug. 19, 2011

(87) PCT Pub. No.: WO2010/063900
PCT Pub. Date: Jun. 10, 2010

(65) Prior Publication Data
US 2011/0298162 A1    Dec. 8, 2011

(30) Foreign Application Priority Data
Dec. 3, 2008  (FR) ..................................... 08 06799

(51) Int. Cl.
B29C 49/32    (2006.01)
(52) U.S. Cl.
USPC .......................................... 264/529; 264/523

(58) Field of Classification Search
None
See application file for complete search history.

(56) References Cited

U.S. PATENT DOCUMENTS

| 4,123,217 A | 10/1978 | Fischer et al. |
| 2009/0139996 A1 | 6/2009 | Jacson et al. |

FOREIGN PATENT DOCUMENTS

| EP | 0 888 864 A1 | 1/1999 |
| WO | 2007/020346 A1 | 2/2007 |

*Primary Examiner* — Monica Huson
(74) *Attorney, Agent, or Firm* — Sughrue Mion, PLLC (57) ABSTRACT

A forming method, in a mold fitted with a wall forming a cavity, of a container from an intermediate container including at least one lateral protrusion projecting toward the exterior of the container. The method includes a boxing operation of pushing the lateral protrusion by an insert movably mounted with respect to the mold between a retracted position in which the insert is retracted into a recess formed in the wall and a deployed position in which the insert protrudes with respect to the wall, in order to form, by overturning, a hollow reserve projecting toward the interior of the container. Also included is an operation to pressurize the intermediate container, including, prior to the boxing operation, injecting a fluid under pressure into the intermediate container; and a local pressurization operation, prior to the boxing operation, of injecting a fluid under pressure into the volume defined in said recess between the lateral protrusion and the insert.

11 Claims, 6 Drawing Sheets

METHOD AND DEVICE FOR FORMING CONTAINERS WITH COUNTER-PRESSURE

CROSS REFERENCE TO RELATED APPLICATIONS

This application is a National Stage of International Application No. PCT/FR2009/001364, filed on Dec. 1, 2009, which claims priority from French Patent Application No. 0806799, filed on Dec. 3, 2008, the contents of all of which are incorporated herein by reference in their entirety.

The invention concerns the forming of containers from blanks made of thermoplastic material, and more specifically the forming of containers fitted with hollow reserves such as integrated handles.

By way of review, the manufacture of containers generally comprises a blowing operation that takes place in a mold, the wall of which defines a cavity into which the blank is inserted; during blowing, the blank presses against the wall under the effect of the high gaseous pressure in the blank, previously heated to allow its plastic deformation.

Some containers can be fitted with hollow reserves that are formed to project toward the interior of the container and are produced for an aesthetic purpose (such as the creation of curves), structural (for example, to produce panels intended to absorb the deformation of the container during hot filling) or functional (to produce a handle for gripping the container).

There are several techniques for forming a hollow reserve on a container.

A first technique consists of using a mold fitted with a movable insert initially retracted into the wall of the mold and deployed when the container is present during formation in the mold in order to push back the material when it reaches the wall, as is illustrated in European patent applications EP 1 922 256 (SIDEL) or EP 346 518 (TOAGOSEI).

A disadvantage of this technique is related to the thermal regulation of the mold, which is generally shortened in order to initiate the cooling of the container before it is ejected from the mold.

Indeed, this cooling of the material makes its deformation more difficult when the insert is deployed. In particular, it can occur that insufficiently deformed material does not press completely against the surface of the insert. The result can be certain defects of appearance that would justify the rejection of the container.

A second technique consists of forming an intermediate container provided with a protrusion that projects toward the exterior of the container, by means of a mold fitted with a recess to form this protrusion during the blowing of the container. The container thus formed is then removed from the mold. An additional step then consists of pushing the protrusion, for example by means of a sliding rod, in order to turn it over to form a hollow reserve projecting toward the interior of the container. In particular, this technique is illustrated in international application WO 2006/014361.

This technique seems to remedy the previously mentioned disadvantages for the first technique described above, because essentially the hollow reserve is formed at the same time as the rest of the container, which facilitates deformation during blowing. However, it is not without its own disadvantages. Indeed, the intermediate container undergoes a cooling, first in contact with the mold and then when removed therefrom, which causes its rigidification. When rigidified, the material offers a certain resistance to the protrusion being turned over, which can cause deformations that are, at the least, unaesthetic.

The invention in particular seeks to remedy the disadvantages of the preceding techniques, by proposing a solution to improve the quality of manufacture of containers fitted with hollow reserves.

To that end, the invention proposes a method of forming, in a mold fitted with a wall forming a cavity, a container from an intermediate container comprising at least one lateral protrusion projecting toward the exterior of the container, which comprises:

A boxing operation consisting of pushing back the lateral protrusion by means of an insert, movably mounted with respect to the mold between a retracted position in which the insert is retracted into a recess formed in the wall and a deployed position in which the insert protrudes with respect to the wall, in order to form, by overturning, a hollow reserve projecting toward the interior of the container;

An operation to pressurize the intermediate container, prior to the boxing operation, consisting of injecting a fluid under pressure into the intermediate container;

A local pressurization operation, prior to the boxing operation, consisting of injecting a fluid under pressure into a volume defined between the protrusion and the insert;

Secondly, the invention proposes a device for forming a container from an intermediate container comprising at least one lateral protrusion projecting toward the exterior of the container, said device comprising:

A mold fitted with a wall defining a cavity;

A boxing insert movably mounted with respect to the mold between a retracted position in which the insert is retracted into a recess formed in the wall and a deployed position in which the insert protrudes with respect to the wall, in order to form, by overturning, a hollow reserve projecting toward the interior of the container;

Means of injecting a fluid under pressure into the intermediate container;

Means of injecting a fluid under pressure into said recess.

Thus, by maintaining a pressure inside the container, it is inflated and pressed against the mold. This avoids the detachment of the container and the deformations thereof caused by the pulling exerted on the material when the protrusion is turned over during boxing.

At the same time, the localized counter-pressure at the recess makes it possible to minimize, and even avoid, possible deformations of the protrusion, due to the inflation caused by the pressure in the container.

Other objects and advantages of the invention will be seen from the following description with reference to the appended drawings in which.

Figure 1:
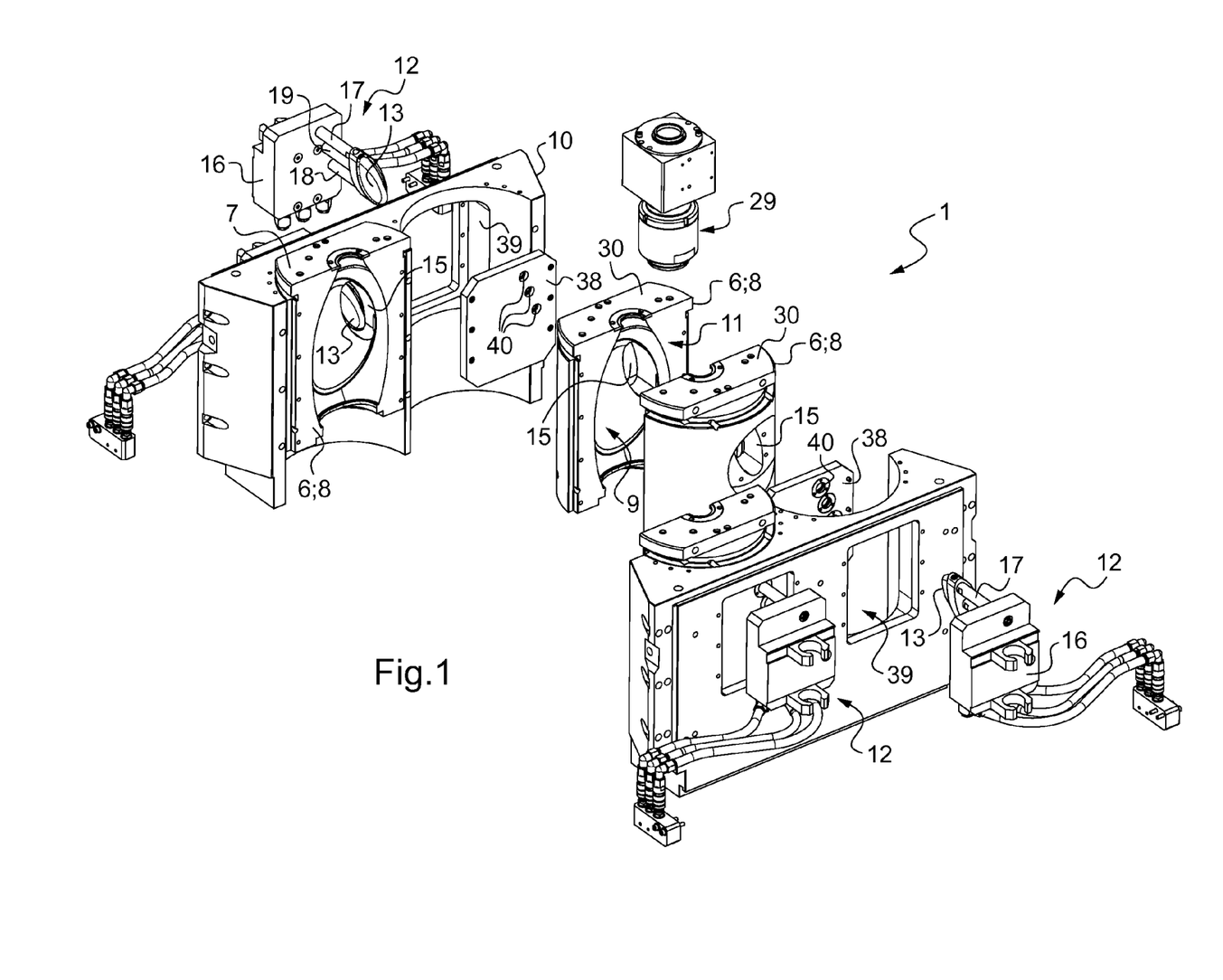
FIG. 1 is a blown-up view in perspective showing a container forming unit equipped with a device according to the invention.

Partially represented in FIG. 1 is a forming unit 1 for a machine to manufacture containers 2 from blanks 3 of plastic material such as PET (polyethylene terephthalate). The term "blank" is used here to designate intermediate containers having undergone a first series of operations in a first mold (for example pre-blowing) and intended to undergo a second series of operations in a second mold (for example blowing).

The term "forming" is used here to designate a finishing operation. In this instance, the forming unit 1 represented here is configured to perform a boxing operation on intermediate containers 3 having undergone pre-blowing and blowing operations. Upon completion of these operations, each intermediate container has on its body two symmetrical protrusions 4 the boxing of which causes them to turn over toward the interior of the container 2, and the subsequent formation of two hollow reserves 5, which together form a handle for gripping the container 2.

As represented in FIG. 1, the forming unit 1 is of the linear type and comprises a plurality of molds 6 each fitted with a wall 7 defining a cavity intended to receive a blank.

More specifically, each mold 6 comprises two mold halves 8, each fitted with a half-cavity 9. The mold halves 8 are mounted facing each other on two mold carriers 10 that are movable in horizontal transfer with respect to a fixed frame (not shown) of the forming unit 1, along a transverse direction perpendicular to a longitudinal direction of feed of the blanks, between:
- a closed position in which the mold carriers 10 are brought together, the mold halves 8 being in mutual contact by a joint plane 11 and the half-cavities 9 jointly forming the cavity of the mold 6;
- an open position (illustrated in FIG. 2) in which the mold carriers 10 are separated from each other to allow the evacuation of the containers 2 and the loading of the blanks 3.

For a more precise description of the kinematics, and one possible embodiment of a system to control the opening and closing of the molds 6, reference can be made to European patent No. 1 924 421 in the name of the applicant.

The forming unit 1 further comprises at least one boxing device 12. Said device 12 comprises a boxing insert 13 provided to push back the wall of the blank 3 at each protrusion 4 in a manner similar to a punch, in order to form, by turning over around an articulation zone or hinge 14, a hollow reserve 5 projecting toward the interior of the container 2.

In this instance, the forming unit 1, configured to accept two blanks 3, comprises two boxing devices 12 mounted facing each other, which are provided to perform a simultaneous boxing of the blank 3 on either side of the joint plane 11 and to produce two symmetrical hollow reserves 5 which together form a handle. Each boxing device 12 therefore comprises two boxing inserts 13 mounted parallel to each other and moving simultaneously.

Each insert 13, produced from a thermally conductive material (i.e. having a high coefficient of thermal conductivity, such as an aluminum alloy) is mounted movable in transfer with respect to the corresponding half mold 8, between a retracted position in which the insert 13 is withdrawn into the wall 7 and a deployed position in which the insert 13 projects outward with respect to the wall 7.

In order to allow the passage and movement of the insert 13, each half mold 8 is provided with a recess 15 made transversely and the contour of which corresponds to the surface traced by the insert 13, with sufficient clearance to allow circulation of air around the insert 13, for reasons that will be explained below.

The boxing device 12 is designed to allow the quick mounting and dismounting of the inserts 13 so as to allow the interchangeability of the inserts 13, either for purposes of repair, or to adapt the unit 1 to forming containers of a different shape or capacity.

In addition to the insert 13, each boxing device 12 comprises a plate 16 substantially parallelepiped in shape, on which the insert 13 is rigidly attached by means of at least two superimposed rods, i.e. an upper rod 17 and the lower rod 18 anchored in the anterior face of the plate 16. According to one embodiment, a central rod 19 can also be provided, between the upper rod 17 and the lower rod 18.

Figure 7:
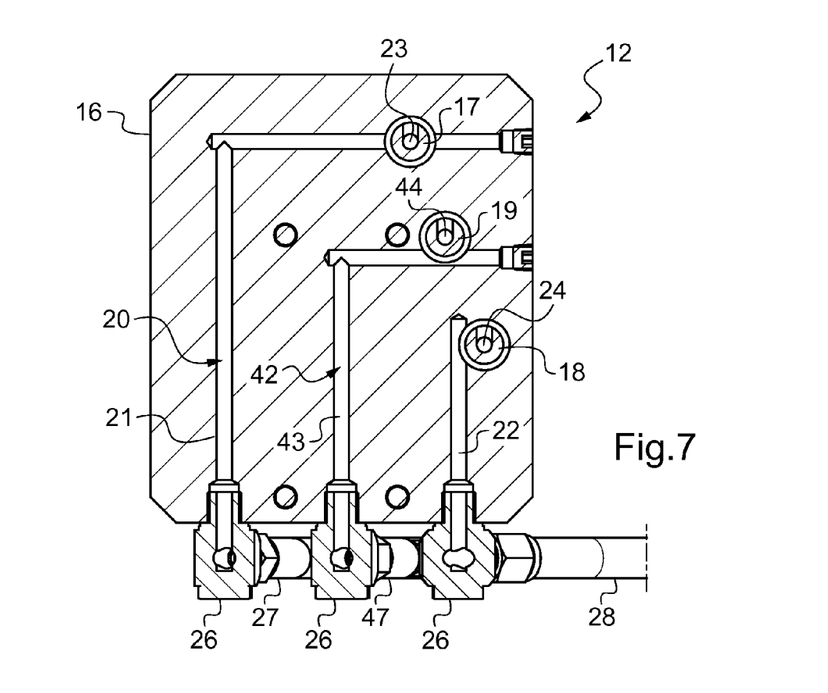
FIG. 7 is a sectional front view in the plate of the boxing module equipping the forming unit of the preceding figures.
Figure 8:
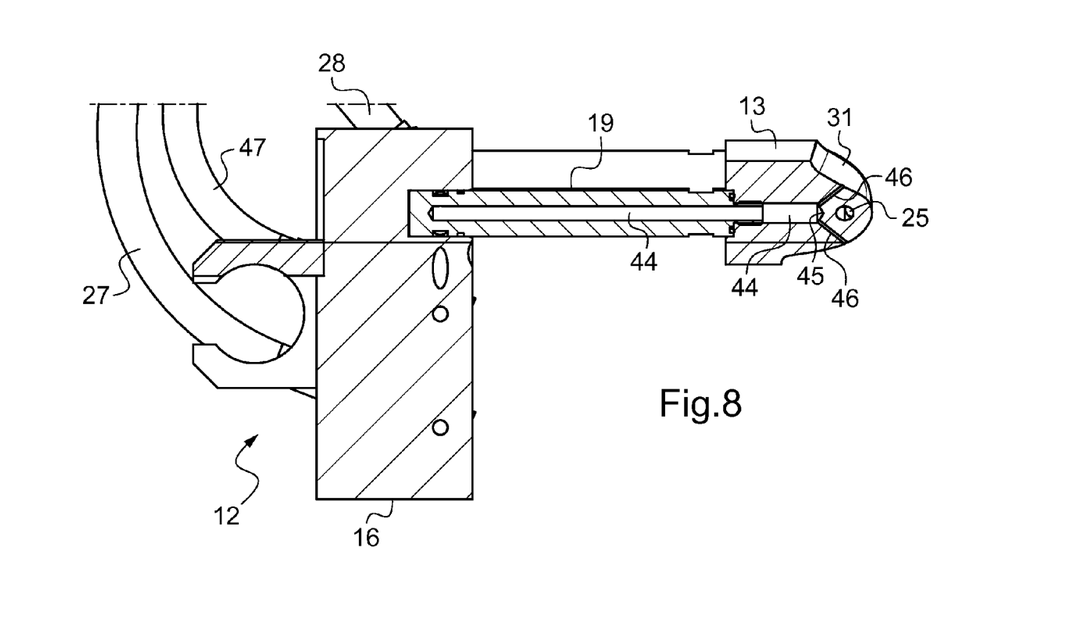
FIG. 8 is a transverse cross-sectional view of the boxing module of FIG. 7.

As illustrated in FIG. 7, the boxing device 12 is provided with a system 20 for heating the insert 13, which comprises a feed line 21 for a heat exchange fluid and an evacuation line 22, drilled in the plate 16 and connected to two bores 23, 24 made respectively in the upper rod 17 and in the lower rod 18 and passing through the insert 13. A duct 25 made in the insert 13 connects the bores 23, 24 to allow the circulation of the fluid and the heating of the insert 13.

The heat exchange fluid is for example water heated to a temperature equal to or greater than the glass transition temperature of the material of which the container 2 is composed (i.e. about 80° C. for PET).

The lines 21, 22 open onto a lower face of the plate 16. Connectors 26 screwed into the openings of the lines 21, 22 connect said lines respectively to flexible feed and evacuation tubes 27, 28 for the heat exchange fluid.

The heating of the insert 13 makes it possible to at least maintain the temperature of the blank 3, at its protrusions 4, at a high value (in the vicinity of the glass transition temperature) where the material is sufficiently malleable so that turning over the protrusions 4 is easy and the stresses exerted on the material does not cause unwanted deformation of the container 2.

In order to avoid unwanted deformations of the blank 3 during the boxing of the protrusions 4, which could cause the detachment of the blank 3 from the wall 7 of the mold 6 due to the pulling exerted on the material, the forming unit is equipped, similar to a blowing unit, with a bell nozzle 29 which, after insertion of the blank 3 in the mold 6 and the closing thereof, is applied against an upper face 30 of the mold 6 to place the interior of the blank 3 in communication with a source of pressurized gas. The gas is air, for example, at a pressure of between 10 and 30 bars, depending on the material of which the blank 3 is composed and its temperature. In the case of a blank 3 made of PET transferred quickly (no more than a few seconds) from a blowing unit located upstream, the temperature of which is still greater than, even substantially equal to or slightly less than the glass transition temperature, a relative pressure of 15 bars is sufficient to keep the blank 3 pressed against the wall 7 of the mold 6 without the risk of detachment during the boxing.

Figure 3:
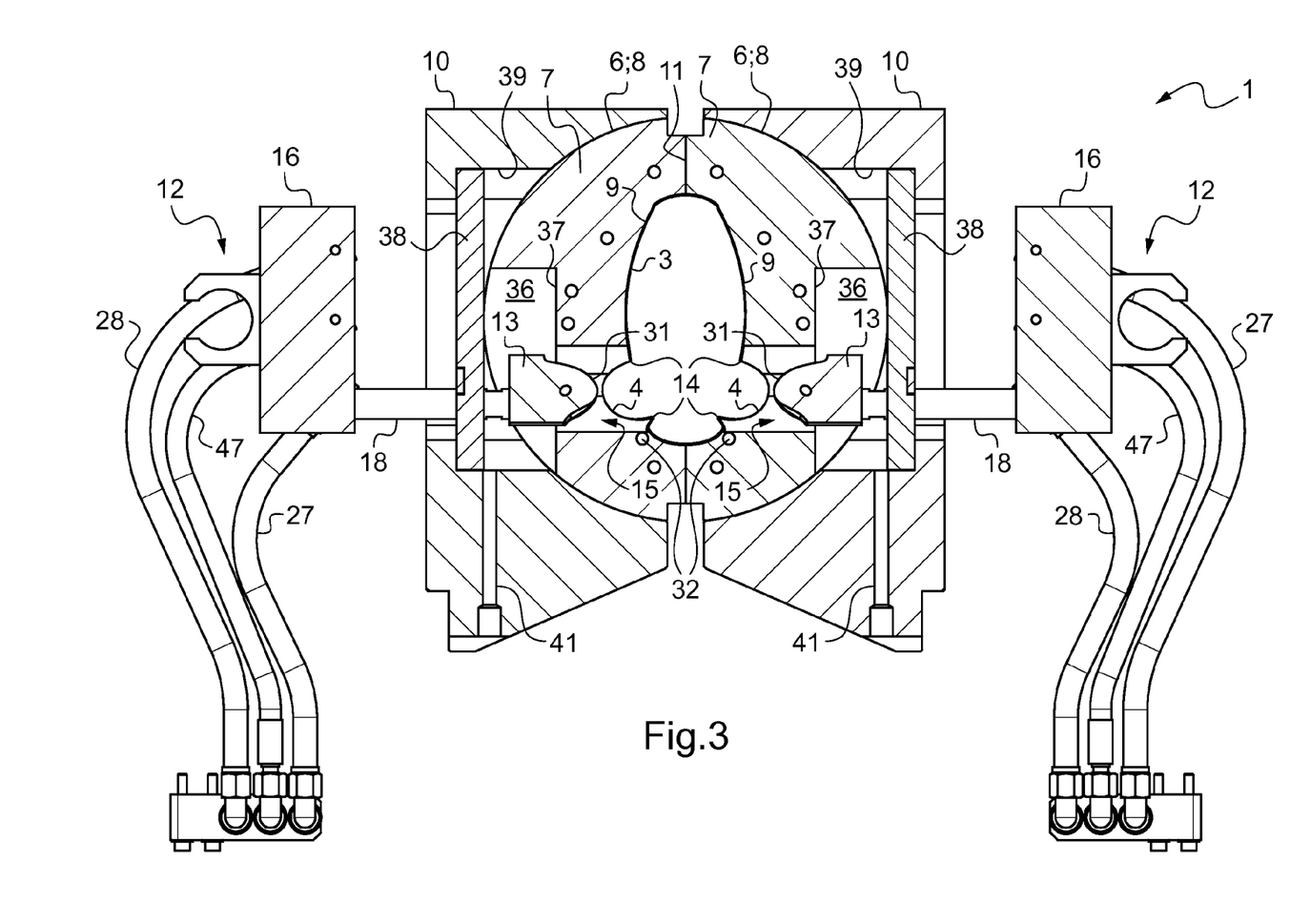
FIG. 3 is a view similar to FIG. 2, showing the forming unit in a closed configuration after the loading of an intermediate container, and prior to the boxing thereof.

This pressure, however, is capable of deforming the protrusions, the curved profile of which fits neither the wall of the recess 15 nor a front surface 31 of the insert 13, corresponding substantially to the counter-impression of the reserve 5 (see FIG. 3). In order to avoid this, the forming unit is equipped with means of injecting a fluid under pressure into the recess 15, upstream from the insert (i.e. between the insert and the protrusion 4) when the blank 3 is present in the mold 6.

Figure 4:
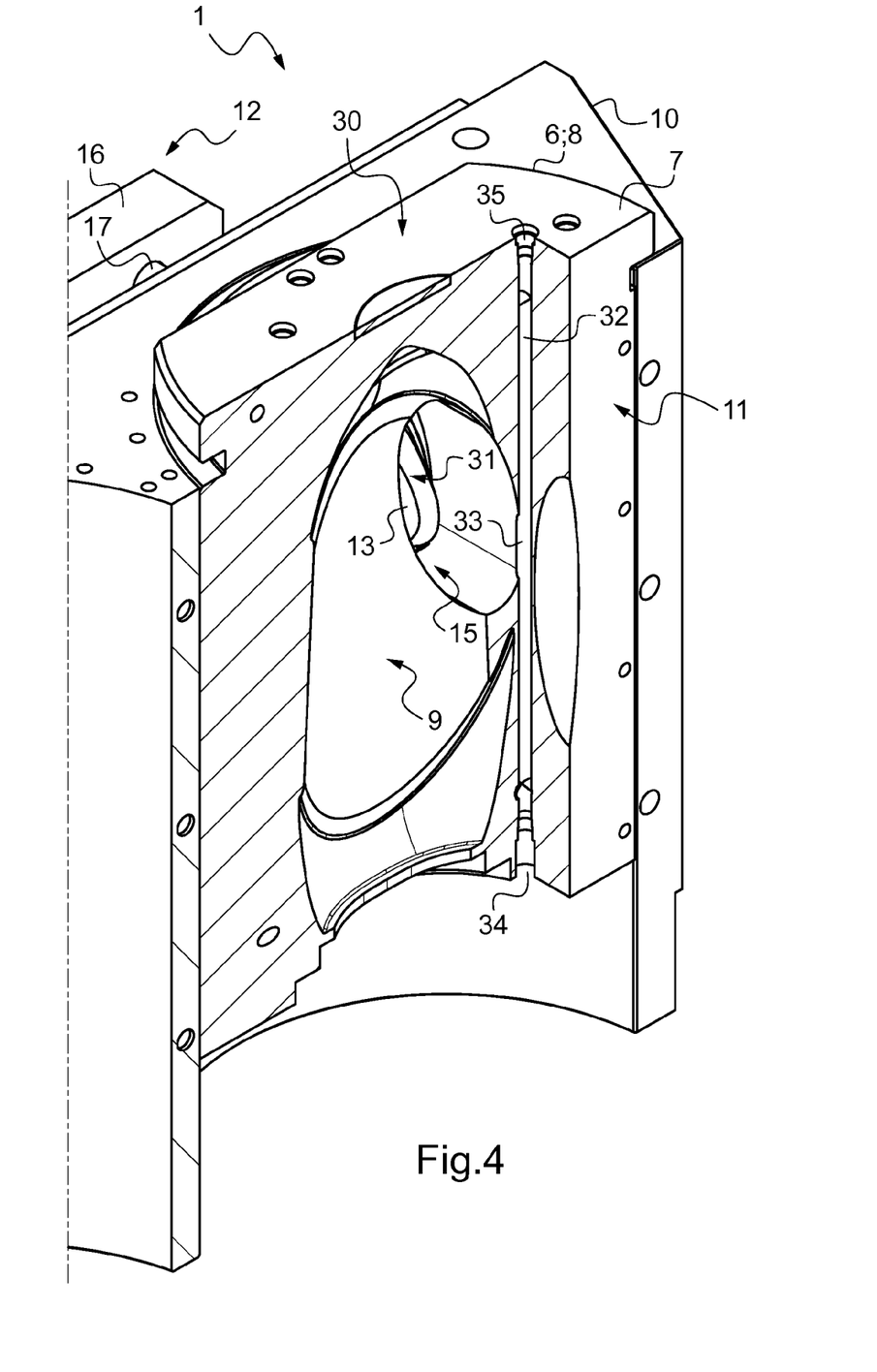
FIG. 4 is a cutaway view in perspective, partially showing the forming unit of FIG. 3.

According to one embodiment illustrated in FIG. 4, said injection means comprise a bore 32 made in the wall 7 of a half mold 8 and opening into the recess 15. In this instance, said bore 32 extends over the whole height of the half mold 8 and has a central portion 33 that opens laterally into the recess 15, near (and preferably as close as possible to) the cavity 9, so as to minimize load losses.

The bore 32 is capped at one lower end 34 (the cap is not shown in FIG. 4); at an upper end 35, the bore 32 is connected to a source of fluid (preferably gas) under pressure. According to one embodiment, the bore 32 is connected to the same pressure source that feeds the bell nozzle 29, so as to equalize the pressures in the blank 3 and in the recess 15 during the boxing. This assembly assumes that a solenoid valve is interposed between the source of pressure and the bore 32. For the sake of economy, it can be simpler to provide a bypass line connecting the upper end 35 of the bore 32 directly to the bell nozzle 29, so that the pressurization of the blank 3 and the recess 15 is done simultaneously without the need to synchronize two different solenoid valves, which would involve taking into account their respective response times.

Figure 5:
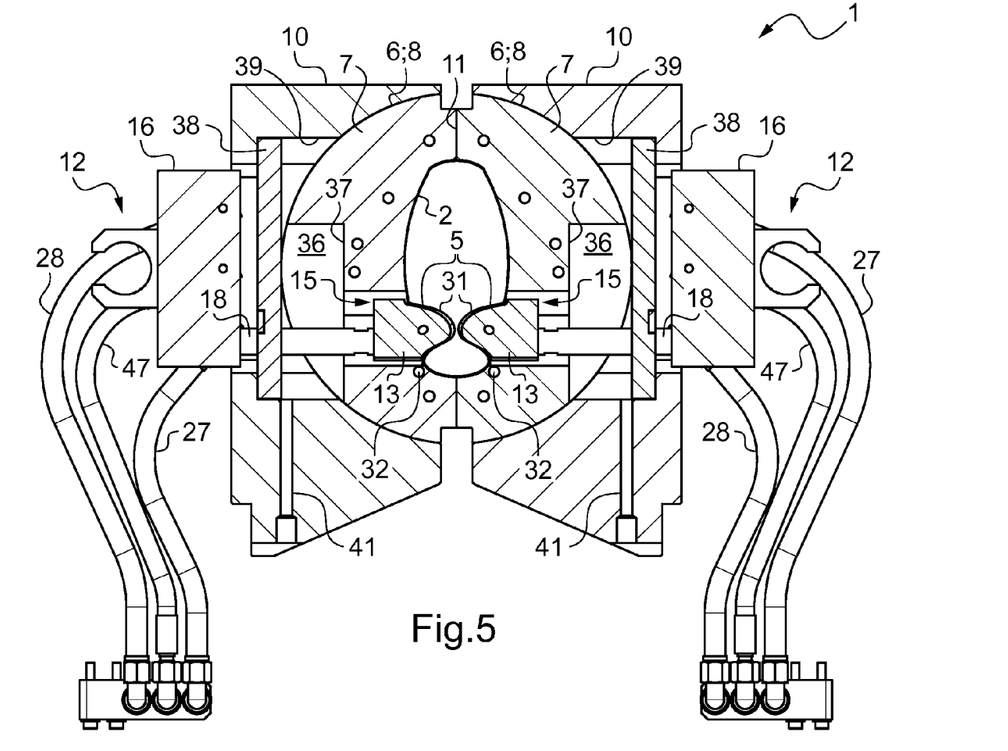
FIG. 5 is a view similar to FIGS. 2 and 3, showing the forming unit in a boxing configuration of the container.
Figure 6:
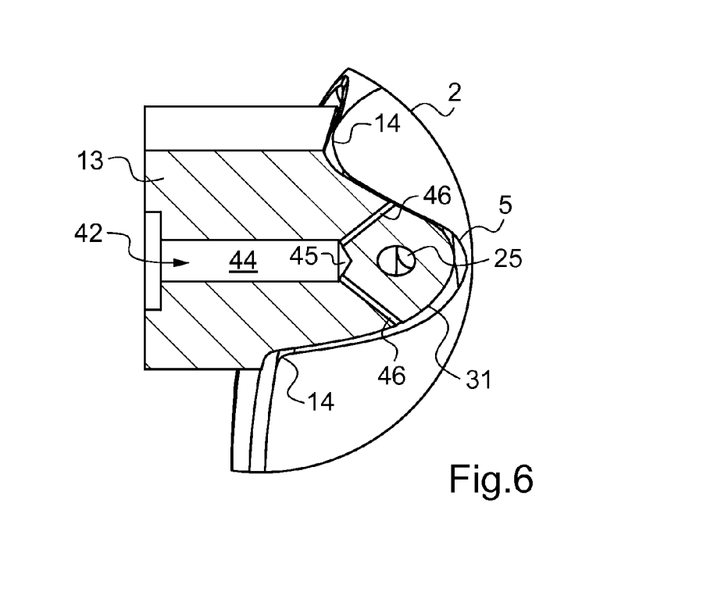
FIG. 6 is a partial cutaway view in another sectional plane, showing a detail of the forming unit of FIG. 5.

According to a preferred embodiment illustrated in FIGS. 4 and 5, the evacuation of the gas injected into the recess is accomplished by the mold carrier 10, in which, behind the half mold 8 a compensation chamber 36 is provided, formed by a hollow reserve in the mold carrier 10 beyond the cylindrical impression corresponding to a rear face 37 of the half mold 8.

Said compensation chamber 36 is sealably closed, opposite the half mold 8, by a plate 38 which seals an opening 39 made in the half mold 8 in order to allow frontal manual access to the boxing device 12.

Said plate 38 includes three superimposed holes 40 in which the rods 16, 17, 18 are slidably mounted to allow the transfer movement of the boxing device 12. The sealing of the passage of the rods 16, 17, 18 through the holes 40 can be ensured by dynamic lip seals mounted in counter-bores formed in the plate 38 around each hole 40.

The compensation chamber 36 is delimited, facing the plate 38, by the rear face 37 of the mold carrier 8.

The pressurized gas in the recess 15 and in the compensation chamber 38 (which communicates with the part of the recess 15 situated upstream of the insert 13 by the clearance around the insert 13) can be evacuated to the exterior by a transverse duct made in the mold carrier 10 and opening into the chamber 36, as illustrated in FIG. 5. Said duct 41 is advantageously connected to a muffler (not shown) arranged at the exterior of the mold carrier 10, making it possible to absorb at least part of the noise due to the decompression of the chamber 36.

The method of forming containers by implementing the forming unit 1 just described can be summarized as follows.

Figure 2:
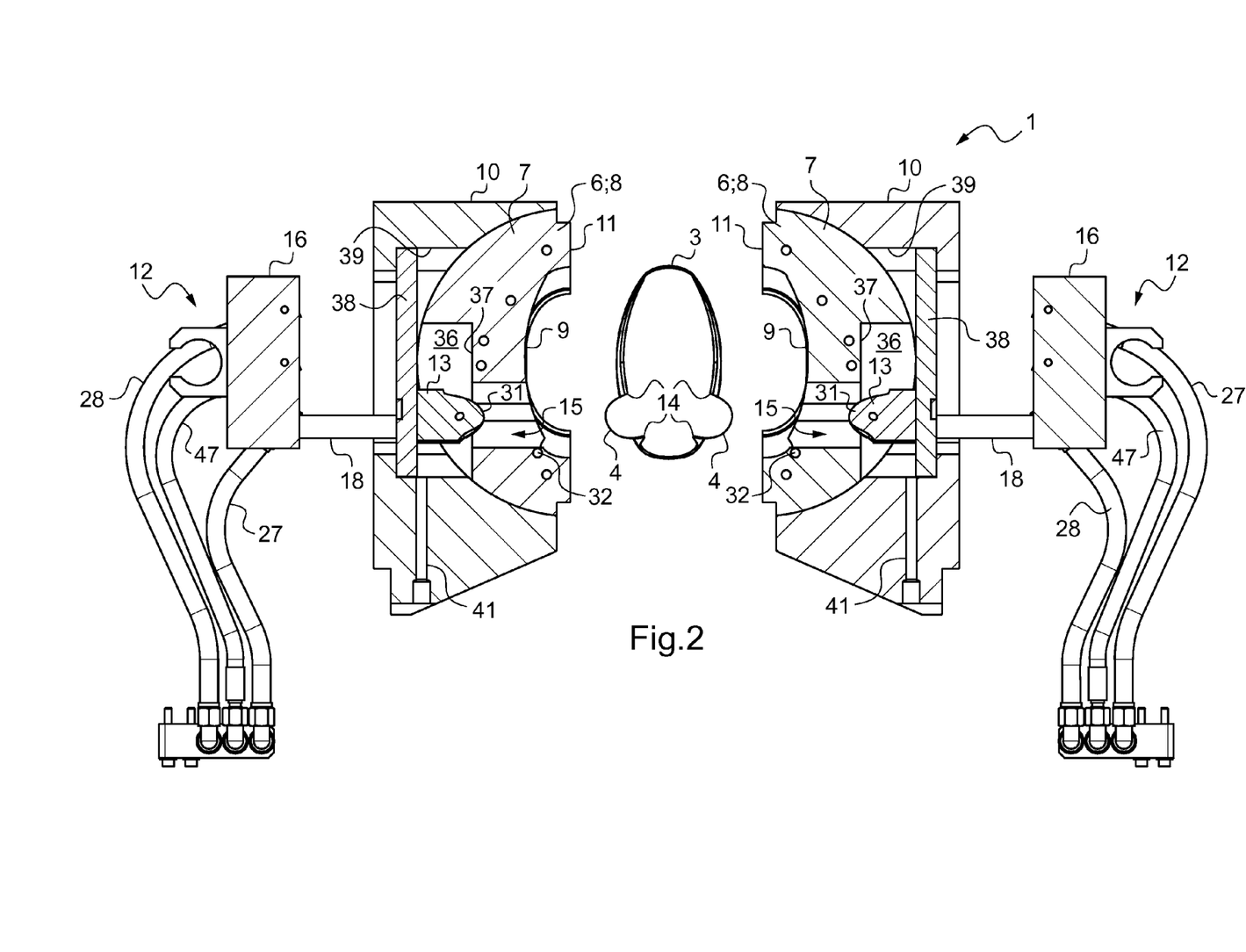
FIG. 2 is a transverse cross-sectional view of the forming unit of FIG. 1, shown in an open configuration during the loading of an intermediate container.

The intermediate container 3 is first loaded into the mold 6, in the open position and with the inserts in the retracted position (FIG. 2). The mold 6 is then closed, the inserts 13 being maintained in the retracted position. The general shape of the intermediate container 3 corresponds to the cavity of the mold 6, the protrusions 4 being received in the openings 15 facing the inserts 13, a short distance therefrom.

The following are then ordered simultaneously:
the pressurization of the blank 3 (prior to the boxing operation), by injection of pressurized air via the bell nozzle 29;
the local pressurization of the recess 15 by injection of pressurized air between the insert 13 and the protrusion 4 via the bore 32.

As we have seen, the counter-pressure provided in the recess 13 makes it possible to equalize the pressures on either side of the protrusion 4, in order to avoid any deformation of the material other than the turnover caused by the boxing.

While the heat from the inserts 13 maintains (or raises) the temperature of the protrusion material 4, the boxing operation is then initiated by which each protrusion 4 is pushed back transversely by the transfer of the corresponding insert 13 in order to form, by overturning around the hinge 14, the hollow reserve 5 projecting toward the interior of the container 2.

Once the turnover of the protrusions 4 is completed, the simultaneous order is given for the depressurization (to the open air) of the interior of the container 3, and the depressurization (to the open air or to the muffler) of the compensation chamber 36 (and therefore of the recess 15) via the duct 41. The evacuation of the air is accompanied by an endothermic relaxation that contributes to cooling—and thus to rigidifying—the container, and more particularly the reserves 5.

As a variation, the means of injecting the pressurized fluid into the recess 15 can be provided directly in the boxing device 12. For that purpose, said device can be provided with an injection system 42 comprising a feed line 43 made in the plate 16, connected to a bore 44 made in the central rod 19 and terminating at a distal end 45 in the insert 13. Said end 45 is connected to two secondary channels 46 which open out onto the front surface 31 of the insert 13.

An additional connector 26 mounted on the plate 16, makes it possible to connect, via a flexible tube 47, the system 42 to a source of pressurized gas, under the same conditions as indicated previously for the feed line 43. Thus, it is preferable to connect the system 42 to a bell nozzle 29 so as to allow an automatic equalization of the pressures in the blank 3 and the recess 15.

The invention claimed is:

1. A forming method, in a mold fitted with a wall forming a cavity, of a container from an intermediate container comprising at least one lateral protrusion projecting toward the exterior of the container, which comprises:
    a boxing operation comprising pushing the lateral protrusion by an insert movably mounted with respect to the mold between a retracted position in which the insert is retracted into a recess formed in the wall and a deployed position in which the insert protrudes with respect to the wall, in order to form, by overturning, a hollow reserve projecting toward the interior of the container;
    an operation to pressurize the intermediate container, comprising, prior to the boxing operation, injecting a fluid under pressure into the intermediate container; and
    a local pressurization operation, comprising, prior to the boxing operation, of injecting a fluid under pressure into the volume defined in said recess between the lateral protrusion and the insert.

2. The method according to claim 1, wherein the operations of pressurization of the intermediate container and local pressurization of the recess are conducted simultaneously.

3. The method according to claim 1, comprising an operation of simultaneous depressurization of the interior of the container and of the recess.

4. The method according to claim 1, wherein the fluid used during the pressurization operations is pressurized air.

5. The method according to claim 4, wherein the air pressure is between 10 bars and 30 bars.

6. A device for forming a container from an intermediate container comprising at least one lateral protrusion projecting toward the exterior of the container, said device comprising:
    a mold provided with a wall defining a cavity;
    a boxing insert movably mounted with respect to the mold between a retracted position in which the insert is retracted into a recess formed in the wall and a deployed position in which the insert protrudes with respect to the wall, in order to form, by overturning, a hollow reserve projecting toward the interior of the container;

means of injecting a fluid under pressure into the intermediate container; and means of injecting a fluid under pressure into said recess.

7. The device according to claim 6, wherein the means of injecting fluid into the recess comprise a bore made in the wall and opening into the recess.

8. The device according to claim 6, comprising a mold carrier to which the mold is attached, and that a system for evacuating the fluid from the recess is provided in the mold carrier.

9. The device according to claim 8, wherein said evacuation system comprises a compensation chamber made in the mold carrier and a duct made in the mold carrier and opening into the compensation chamber.

10. A machine for manufacturing containers, comprising a device according to claim 6.

11. A device for forming a container from an intermediate container comprising at least one lateral protrusion projecting toward the exterior of the container, said device comprising:

a mold provided with a wall defining a cavity;

a boxing insert movably mounted with respect to the mold between a retracted position in which the insert is retracted into a recess formed in the wall and a deployed position in which the insert protrudes with respect to the wall, in order to form, by overturning, a hollow reserve projecting toward the interior of the container;

an injector opening that injects a fluid under pressure into the intermediate container; and another injector opening that injects a fluid under pressure into said recess.

* * * * *